(No Model.) 2 Sheets—Sheet 1.
E. THOMSON.
ALTERNATING CURRENT DYNAMO ELECTRIC MACHINE.
No. 522,241. Patented July 3, 1894.
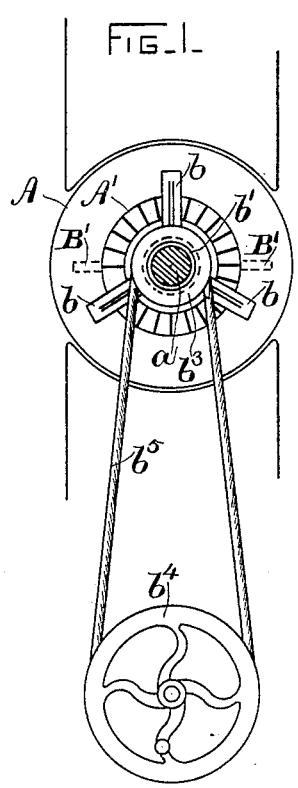
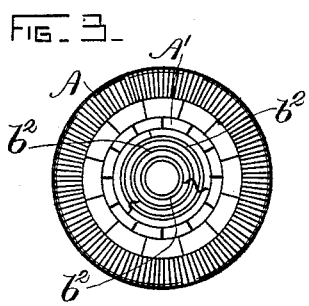
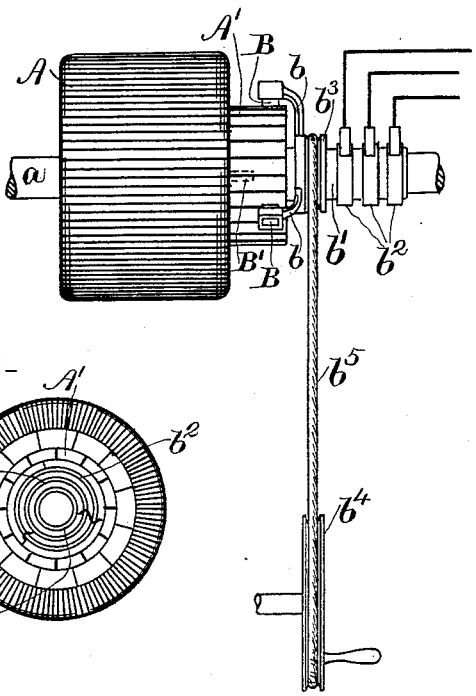
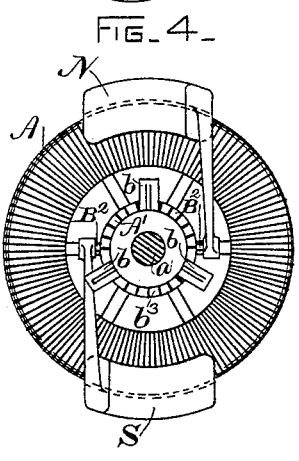
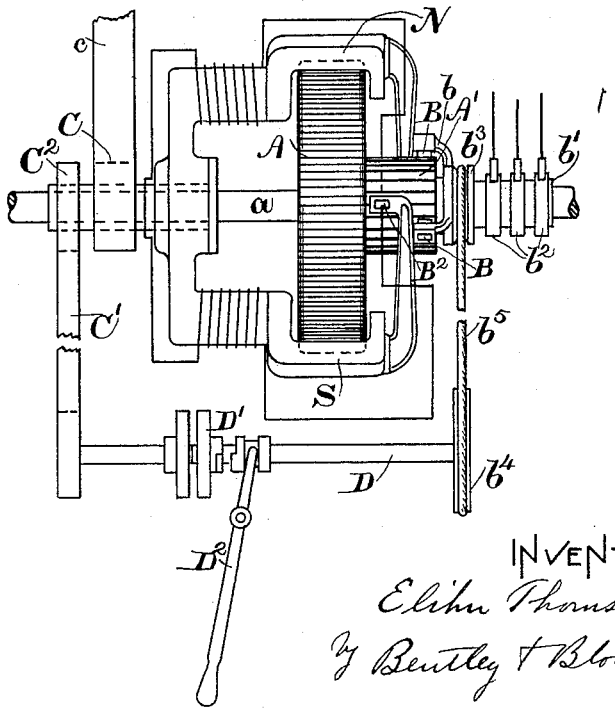
WITNESSES
Alec F. Macdonald.
J. J. Livermore
INVENTOR
Elihu Thomson,
By Bentley & Blodgett
Attys.

(No Model.) 2 Sheets—Sheet 2.
E. THOMSON.
ALTERNATING CURRENT DYNAMO ELECTRIC MACHINE.
No. 522,241. Patented July 3, 1894.
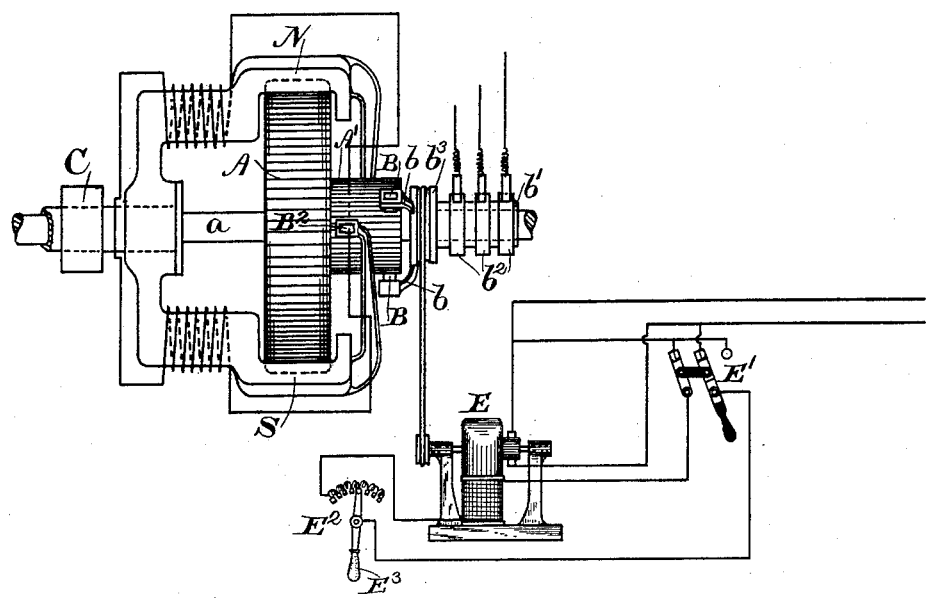
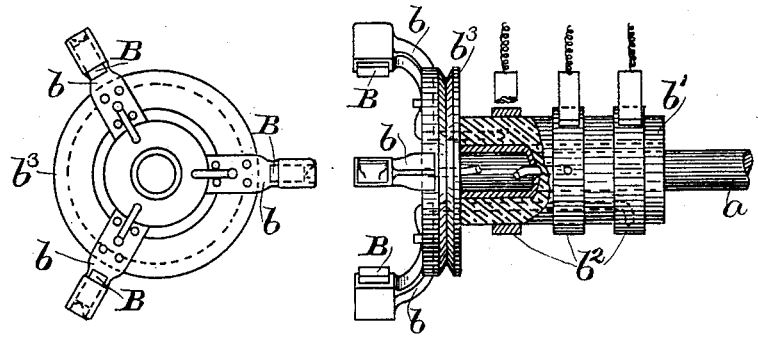
WITNESSES
INVENTOR
Elihu Thomson,
By Bentley & Blodgett
Attys.

UNITED STATES PATENT OFFICE.

ELIHU THOMSON, OF SWAMPSCOTT, ASSIGNOR TO THE GENERAL ELECTRIC COMPANY, OF BOSTON, MASSACHUSETTS.

ALTERNATING-CURRENT DYNAMO-ELECTRIC MACHINE.

SPECIFICATION forming part of Letters Patent No. 522,241, dated July 3, 1894.

Application filed October 21, 1893. Serial No. 488,771. (No model.)

*To all whom it may concern:*

Be it known that I, ELIHU THOMSON, a citizen of the United States, residing at Swampscott, in the county of Essex and State of Massachusetts, have invented a certain new and useful Improvement in Alternating-Current Dynamo-Electric Machines, of which the following is a specification.

My invention relates to dynamo electric machinery and consists in certain improvements in alternating current generators or motors, whereby, in the case of a generator, the periodicity of the current fed therefrom to the line may be varied while the machine is running at constant speed. Conversely, in the case of a motor fed from a circuit carrying currents of substantially constant periodicity, the periodicity of the current received by the motor can be varied with respect to that of the line, and the speed of the motor thereby controlled and regulated.

In carrying out my invention I provide a commutator the segments of which are connected in the usual manner to the respective coils of an armature of any ordinary type, and upon said commutator I place brushes adapted to take current therefrom but independently revoluble, that is to say, capable of revolving therewith or of revolving faster or slower with relation thereto, so that they may remain constantly in contact with the same segments respectively or may travel from one of said segments to another according to the respective rates of speed at which the said armature and brushes revolve. These brushes are connected to collecting rings from which, in the case of a generator, alternating currents are collected by suitable collecting devices. If, now, the said brushes rotate at the same rate of speed as the armature, it is evident that the periodicity of the current at the collecting rings will be dependent upon the velocity of the armature just as if the coils of the said armature were directly connected to the rings. If, however, the said brushes were rotated at a speed greater or less than that of the armature, the rings connected to said brushes would receive impulses of current with greater or less frequency; in other words the periodicity of the current would be modified according to the rate of rotation of the brushes. Conversely, in the case of a motor, the periodicity of the current collected at the rings is modified by the rotation of the brushes before reaching the coils of the armature.

My invention, thus briefly outlined, together with various modifications of the means by which its object is attained, will now be more fully described, reference being made to the accompanying drawings, in which—

Figure 1 is an end elevation of a machine embodying a revolving armature and revolving brushes; Fig. 2 a side elevation of the same; Fig. 3 an explanatory diagram; Fig. 4 an end elevation showing a modification in which a revolving field is employed with a stationary armature; Fig. 5 a side elevation of the same; Fig. 6 a further modification of the construction shown in Fig. 5; Figs. 7 and 8 details showing the brushes and connections therefrom.

Referring to Figs. 1 and 2 the armature A of a dynamo electric machine either generator or motor is provided with a commutator A' upon which bear the brushes B arranged one hundred and twenty degrees angularly apart, such being the arrangement when currents of the three phase type are to be employed in a bi-polar construction such as is shown. It is obvious moreover, that by suitable modifications the machine can be of the multipolar type and can also be adapted to generate or receive currents of any desired phase period. The said brushes B are carried by arms $b$, mounted on the sleeve $b'$ upon the armature shaft $a$, the said sleeve also carrying the collecting rings $b^2$, respectively connected to the brushes B. The arrangement of said brushes and the connections between them and the rings $b^2$ are best illustrated in Figs. 7 and 8. A pulley $b^3$, capable of being suitably rotated by means of a driving wheel is also mounted on said sleeve $b'$ and serves to rotate the said brushes and rings independently of the armature. In the drawings the said pulley $b^3$ is rotated by the wheel $b^4$ and belt $b^5$, but obviously any other means controlling the direction and speed of rotation of said brushes might be employed. The armature may have a Gramme or Siemens winding, and the coils are respectively connected to the segments of the commutator in the usual manner. Direct currents might be led to or from such an armature by means of brushes resting on the commutator at the extremities of a diameter which would be situated, were there no distortion of field, immediately between the field poles, as is well known, and forward of this point in the direction of revolution when distortion or self-induction exists. Instead of the machine being a dynamo it may, by the passage of electric currents into the commutator and armature coils, by the application of suitable brushes connected to a suitable circuit, which brushes, B', are indicated by dotted lines, Figs. 1 and 2, be caused to revolve at a rate depending on the electro-motive-force supplied, and the strength of the field in which the armature moves. Such an armature, however, might obviously be caused to generate or receive alternating currents by connecting the coils in the proper manner to suitable collecting rings, or, what is the same thing, connecting the segments of the commutator to which these coils lead to such rings. Obviously, permanent connections might be made between certain segments of such a commutator and rings supplied with current collecting devices, such an arrangement being shown in Fig. 3, where connections one hundred and twenty degrees apart are respectively led from the commutator segments to the rings. In the present apparatus, however, such connections are made through the brushes B, said brushes remaining constantly in contact with the same respective segments, or traveling from one segment to another according to their velocity of rotation with relation to that of the armature A. If then the machine is to be used as a motor, and alternating currents are fed to the rings $b^2$, impulses of current will be transmitted through the brushes B and segments A' to the coils of the armature, and if the brushes B are rotated in unison with the armature and its commutator, it is obvious that they will remain constantly in contact with the same segments. The result in this case is the same as if coils of the armature were directly connected to the rings without the intervention of the brushes B; that is the velocity at which the armature rotates is dependent upon the phase-periods of the currents in the circuit. If, however, the said brushes B are rotated in either direction independently of the armature, the connections between the armature and the line are correspondingly shifted forward or backward, and the periodicity of the currents received by the armature is thus varied. The speed of the machine can in this way be regulated by changing the speed and direction of the rotating brushes. In like manner the periodicity of currents fed from a machine made in accordance with my invention and used as a generator can be varied by the proper manipulation of the brushes B.

The same principle and substantially the same apparatus may be employed, as shown in Figs. 4, 5 and 6, with a stationary armature and revolving field magnets. In this case the field magnets N and S are journaled upon the stationary armature shaft $a$, and are driven by a pulley C and belt $c$. Current is fed to suitable coils thereon by means of brushes $B^2$ resting upon the commutator A' and rotating with said field magnets. The brushes B and rings $b^2$ are the same as in Figs. 1 and 2. In this case if the said brushes B remain stationary, the periodicity of the currents will be normal, while a rotation of said brushes in the direction of rotation of the field magnets will decrease and in the opposite direction increase, the periodicity.

In Fig. 5 mechanical means are employed whereby the field magnets themselves are caused to drive the rotating brushes B, by means of the pulley $C^2$, belt C', and countershaft D. A clutch D' and operating lever $D^2$ are adapted to connect the pulley $b^4$ to said countershaft, thereby causing the brushes B to rotate therewith. Any suitable reversing and speed regulating device may thus be employed, whereby the direction and velocity of rotation of said brushes may be controlled.

In Fig. 6, instead of a mechanical device, a small motor E is shown belted to the brushes B, and provided with a reversing switch E' and regulator $E^2$ having an operating handle $E^3$. Thus by means of the said switch and regulator, the direction and velocity of the brushes B are determined, and the periodicity of the alternating currents fed to the main motor, and the consequent speed of said motor, controlled.

It is to be understood from the foregoing description that the machine which forms the subject of my invention is an alternating current generator or motor in the sense only that it deals with alternating currents, and I do not intend to limit myself to any particular type of machine, since it is obvious that the invention is applicable to all dynamo-electric machines, whether they be of the type ordinarily used in alternating-current work or that used in direct current work.

Having thus described my invention, what I claim as new, and wish to protect by Letters Patent of the United States, is—

1. The method of varying the periodicity of an electric current, which consists in successively and continuously changing the points of line connection in either direction around a rotating commutator independently of its own rotation.

2. A dynamo-electric machine having a rotating member connected to line, and means for continuously shifting the line connections with the windings of such rotating member in either direction with reference to its rotation, and so varying the periodicity of the currents delivered or received thereby.

3. A dynamo-electric machine comprising a field magnet and armature, one of the two rotating with reference to the other, a commutator having its segments connected to the coils of the armature, brushes resting on the commutator through which impulses of current are received or delivered by the machine, and means for moving the brushes continuously in either direction around the commutator from segment to segment independently of the rotation of the commutator itself, and thereby shifting the points of connection between said commutated member and the line, as set forth.

4. A dynamo-electric machine comprising field magnets, a rotating armature, a commutator, brushes bearing against the commutator spaced to take off and receive alternating currents of any desired succession of phase, rings connected to said brushes through which alternating currents are delivered to or received from a suitable circuit, and means whereby the brushes may be shifted from segment to segment around the commutator in either direction independently of its rotation, thus shifting the points of connection between the armature of the line and varying the periodicity of the current, substantially as described.

5. A dynamo electric machine of the alternating type, comprising field-magnets and a commutated armature, brushes carried by a sleeve on the shaft of said armature and capable of rotation thereon, rings electrically connected to said brushes through which the line connections are made, and means for rotating said sleeve and brushes in either direction around said armature, substantially as and for the purpose described.

6. A dynamo electric machine of the alternating type, comprising a stationary member and a rotating member in inductive relation to each other, a commutator connected to one of said members, brushes resting on said commutator and connected to rings through which alternating currents are delivered to or received from a suitable circuit, said brushes being mounted to rotate around said commutator, and gearing and speed regulating devices between said brushes and said rotating member whereby said brushes can be rotated at any desired speed in either direction around said commutator, substantially as described.

In witness whereof I have hereunto set my hand this 19th day of October, 1893.

ELIHU THOMSON.

Witnesses:
JOHN W. GIBBONEY,
BENJAMIN B. HULL.